W. HAILES.

Stove Grate.

No. 1,521. Reissued Aug. 11, 1863.

Witnesses:
R. T. Campbell.
W. G. Hofer

Inventor:
Wm Hailes
by his Attys
Mason, Fenwick & Lawrence

N. PETERS, Photo-Lithographer, Washington, D. C.

UNITED STATES PATENT OFFICE.

WILLIAM HAILES, OF ALBANY, NEW YORK.

IMPROVEMENT IN GRATES FOR STOVES.

Specification forming part of Letters Patent No. 36,950, dated November 18, 1862; Reissue No. 1,521, dated August 11, 1863.

*To all whom it may concern:*

Be it known that I, WILLIAM HAILES, of Albany, in the county of Albany and State of New York, have invented a new and Improved Grate for Coal-Stoves and Furnaces; and I do hereby declare that the following is a full, clear, and exact description thereof, reference being had to the accompanying drawings, making a part of this specification, in which—

Figure 3:
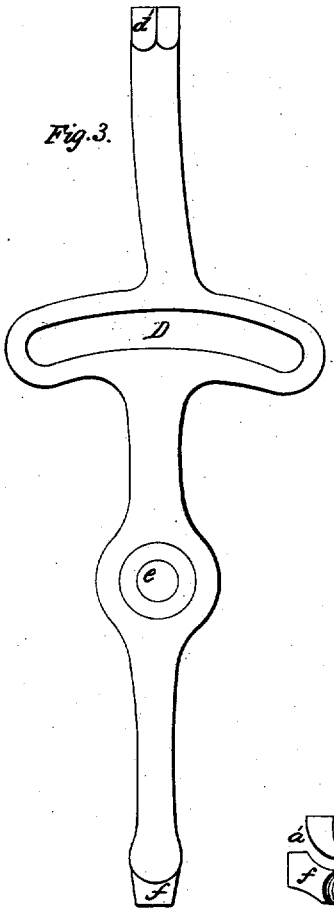
Figure 1:
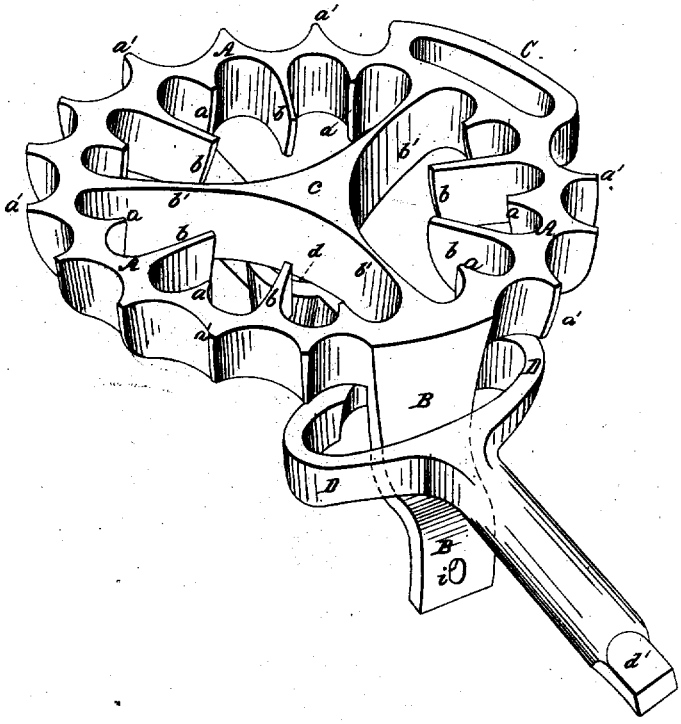
Figure 2:
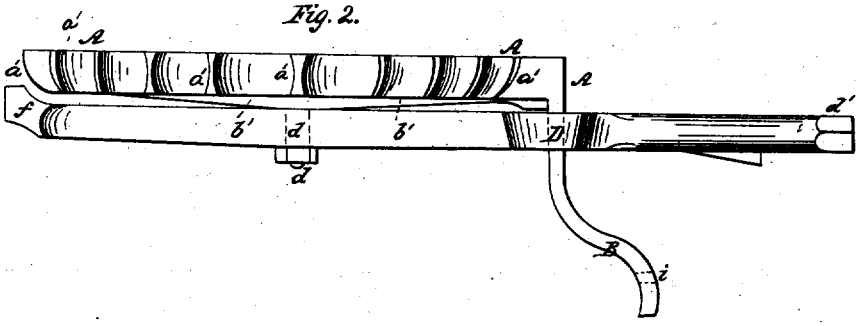

Figure 1 is a perspective view of my improved grate complete. Fig. 2 is a side elevation of Fig. 1, showing the manner of connecting the oscillating shaft to the grate proper. Fig. 3 is a top view of the oscillating slotted bar.

Similar letters of reference indicate corresponding parts in the three figures.

This invention relates to certain new and useful improvements in the construction of that class of grates for stoves, furnaces, &c., which are capable of receiving a horizontal oscillating motion about a fixed center, as well as an oscillating or tipping movement in a vertical plane.

The object of my invention is to so construct a grate that the spaces or openings through it increase in size and area as they approach the center, thereby compensating for the decrease of circular motion given to the grate, and causing it to deliver or relieve itself of impurities, clinkers, and ashes equally all over its surface, enabling me to keep the fire up for an indefinite length of time without dumping or emptying the fire-pot, as will be hereinafter described.

My invention also has for its object so constructing a grate that while I obtain all the advantages of a horizontal as well as a vertical movement and ease in manipulation, as above described, I am enabled to use only two parts or castings, instead of three or more, as hitherto, and to diminish the labor of manufacturing the grate, inasmuch as all riveting, fitting, and bolting are done away with, which is always a serious drawback in manufacturing and furnishing cheap castings to the market.

To enable others skilled in the art to make and use my invention, I will proceed to describe its construction and operation.

In the accompanying drawings, A represents the rim of the grate, which is formed inside and outside of scallops, the projecting portions *a'* of which are of a uniform length outside and vary in length on the inside of the rim, as shown in Fig. 1. These latter projections *a b* form radial supports for the bed of coals, and, being made alternately long and short, the openings through the grate diminish in extent as they approach the circumference of the rim A, leaving comparatively large openings near the center of the grate and small openings near its rim. The radial arms *b'* terminate at the center of the grate in a small hub, *c*, from the bottom of which projects a center pin, *d*, for receiving the bar by which the grate is tipped over, as will be hereinafter described. The circumference of the grate is not entirely made up of scallops, a blank space being left for a curved tongue, B, which projects downward and outward a suitable distance to serve as a means by which the grate can be vibrated when arranged within a stove, and, besides this, a slotted projection, C, is formed on the circumference of the rim A, in order to prevent the grate from tilting but in one direction, there being a small projection cast on the grate-frame for the projection C to rest upon when the grate is shaken or vibrated. With these two exceptions the circumference of the rim A is made up of scallops, as described, which form passages for the escape of ashes, &c., and serve as shakers or agitators to crush or break up any clinkers, &c., which may get between the grate and the fire-pot, thereby preventing the accumulation of ashes and the consequent clogging of the parts. These parts thus constructed all constitute the grate proper, and all form one solid homogeneous piece. The curved tongue B, unlike any other tongue answering its purpose, is formed on the grate in casting the same with as little difficulty as in molding and casting any other portion of the grate, and the entire rim of the grate can in this way be made very thin at all points, leaving no thick portions, which would form obstructions to the escape of ashes, &c., for riveting or bolting separate pieces to the rim, as hitherto.

Having thus made one piece, it is necessary to obtain such a support for it as will keep it in place within the fire-pot and at the same time allow it to be rotated in a vertical plane, or "dumped," as the operation is called, for cleaning out the fire-pot. This I accomplish by means of a bar, which is represented in Fig. 3. This bar is also cast in one piece, and is constructed as follows: The square projection *d'* is for receiving a key, by means of which the bar and with it the grate is tipped over. A hole, *e*, is made through the bar for receiving the center pin, *d*, on the grate. A segmental slot or loop, D, is made for receiving the lug or tongue B, and a rounded journal, *f*, is formed on one end of this bar, which projects into an opening formed in the fire-pot for supporting this end. Thus constructed, this segmental slotted bar of Fig. 3 serves all the purposes of a support for the grate, and at the same time allows the tongue B to be vibrated when it is desired to relieve the fire-pot of ashes, burnt cinders, &c. To put these two parts (grate and bar) together the tongue B is passed down through the segmental slot D in the bar, and the center pin, *b*, is passed through the hole *e*, and by means of a nut or pin passed through the end of this portion *d* the grate and its bar are attached together, as shown in Fig. 2. A poker or short rod is used for giving a vibratory or shaking motion to the grate, said bar being inserted into a hole, *i*, in the tongue B, and the extent of this motion is controlled or limited by the length of the segmental slot D in the supporting-bar.

The manner of tipping the grate by partially turning the bar supporting it has already been described.

Experience has taught me that the best results are obtained by a grate which presents the least amount of iron surface to the fire, for two reasons: First, there is less obstruction to the air in its course to the fire to support combustion; and, second, increased capacity (of grate) to relieve or rid the fire-pot of all obnoxious substances without being compelled to empty and rekindle the fire every day. I have therefore constructed my grate with large air-spaces, which, as a consequence, reduces the thickness of the grate-bars, rim, and projections from its periphery. These parts I make as thin as possible, without losing strength or weakening the grate to such an extent as to render it too fragile or liable to rapid destruction in the fire, and in order that this may be done I cast the tongue B with the grate, so that it is not necessary to leave any great body of metal for receiving bolts by which to rivet a tongue to the grate, as hitherto, and this mode of forming the tongue B enables me to cast my grates very thin at all points and at the same time to obtain the requisite strength for all practical purposes.

Another advantage of my improved grate is that it is not liable to become clogged up with ashes or cinders which have passed through the gratings, as the vertical slot which is made through the grate-supporting bar is always open, clears itself, and allows anything falling down from the grate to pass through it into the ash-pit, while in the old grates having a looped clasp and a horizontal slot for a straight supporting-bar this clasp forms a shelf under the grate, which receives and accumulates a large part of the ashes and cinders falling from the front part of the grate, and it is a well known fact that the cinders get between the sides of the bar and the clasp and render the shaking of the grate a very difficult operation. Then, again, it is obvious that such a clasp could not be cast with the grate without a great deal of expense and labor, as the underhanging portions thereof are antagonistic to the openings through the grate, and necessarily require to be cast separately and the two parts bolted together afterward. Separate patterns and separate flasks are required, and when the castings are made they require to be sent to the finisher, who puts them together with wrought iron rivets or bolts. All of this extra expense and labor I save by casting a curved tongue, B, on the circumference of my grate—a portion of which is perpendicular, or nearly so, to the face of the grate—and passing this portion through a vertical slot, D, in the supporting-bar. This narrow extension of the rim of the grate serves in my improvement as the means by which the grate is shaken, and it can be cast in one piece with the grate without using dry-sand cores, using simply the green sand and the ordinary contrivances for making common castings. With this lever-extension for operating the grate it is necessary to provide a means by which the grate can be tilted over with facility for discharging the contents of the fire-pot. This operation I accomplish by means of the segmental slotted bar which has already been described. Thus it will be seen that instead of using a separate and distinct casting as a means for vibrating the grate, I dispense with such altogether, and obtain the advantages of a vertical slot through which to pass my curved tongue B. I dispense with the horizontal slot and all attendant accumulating surfaces, and obtain a much cheaper, more durable, and a more easily manufactured grate than hitherto.

The durability of my grate over the old grates lies in the fact that I use no wrought-iron rivets, which soon burn out and allow the parts which they secure to the grate to fall down, and its simplicity consists in so constructing it of two parts that they can be separated or replaced at pleasure.

In regard to the openings through the grate I will further state that the objection to this class of grates with an accelerated motion has been the unevenness of discharge, the motion decreasing on the line extending from the circumference to the center, so that a grate with regular openings, as in ordinary grates, would not relieve itself of ashes, &c., equally over its whole surface. The discharge of ashes through the grate will be in proportion to its velocity where the openings are uniform. Hence the varying openings. Some have made this class of grate in two parts, the center part not only solid, but stationary, the outside part only oscillating around it. The true principle appears to be to increase the center motion rather than stop it. I compensate for this accelerated motion by the peculiar openings in my grate, extending from the periphery to the center pin, the largest openings being at or near the center, where there is the least motion, and decreasing in size as the motion of the grate increases, so that the grate will, when agitated, discharge as freely at or about the center as at the periphery.

I do not claim any particular form of varying openings in my grate, because other forms will answer, my object being to make openings which will compensate for the difference of motion at the center and at the circumference of the grate, so that one will counteract the other when the grate is oscillated, as herein described; but

What I claim as new, and desire to secure by Letters Patent, is—

1. A grate having varying openings or spaces extending from or about the center thereof to the circumference or rim, when constructed substantially as shown in Fig. 1, with a series of long and short projections, *a b*, running toward its center, substantially as described.

2. In combination with the above, the projections *a′ a′* on the circumference, all for the purposes herein described.

3. Casting a grate with the tongue portion B forming an extension of the rim of the grate and constituting the means whereby the grate can be operated, substantially as described.

4. The supporting-bar for the grate, when constructed with the vertical segmental slot D through it for receiving and allowing a f circular play to be given to the tongue B and also to the grate, of which this tongue forms a part, substantially as described.

5. The curved tongue portion B formed on the grate, in combination with the vertically-slotted segmental portion D formed on the rocking-bar, operating substantially as and for the purposes described.

WM. HAILES.

Witnesses:
JNO. G. TREADWELL,
ANDREW DICKY.